United States Patent [19]
Pfeffer

[11] 4,369,582
[45] Jan. 25, 1983

[54] MANUAL LABEL APPLYING TEMPLATE

[75] Inventor: George B. Pfeffer, Minnetonka, Minn.

[73] Assignee: Datafile Limited, Willowdale, Canada

[21] Appl. No.: 316,346

[22] Filed: Oct. 30, 1981

Related U.S. Application Data

[63] Continuation-in-part of Ser. No. 205,168, Nov. 12, 1980, abandoned.

[51] Int. Cl.³ ............................................... G01B 5/00
[52] U.S. Cl. ........................... 33/180 R; 156/DIG. 2; 156/DIG. 27
[58] Field of Search ................ 33/1 G, 174 G, 180 R; 156/DIG. 2, DIG. 3, DIG. 23, DIG. 27

[56] References Cited
U.S. PATENT DOCUMENTS

| | | | |
|---|---|---|---|
| 1,081,759 | 12/1913 | Marchese | 33/180 R |
| 1,875,410 | 9/1932 | Babcock | 33/180 R |
| 3,057,073 | 10/1962 | Swartz | 33/180 R |
| 3,243,886 | 4/1966 | Littman et al. | 33/180 R |
| 3,308,547 | 3/1967 | Tuppen, Jr. | 33/180 R |
| 4,240,848 | 12/1980 | Barber | 156/DIG. 3 |
| 4,295,275 | 10/1981 | Cugini, Sr. et al. | 33/1 G |

*Primary Examiner*—Richard R. Stearns

[57] ABSTRACT

The present invention provides a label jig adapted to guide accurate manual application of an adhesive label or label cover at an edge of a file panel. The jig includes a file edge guide, a label edge guide, raised relative to the file edge guide and a seat portion between and at generally right angles to the edge guides at the top of the file edge guide and at the base of the label edge guide. The seat portion which is used to seat only part of the label has low affinity for the adhesive on the label so as not to detract from its adhesiveness when the seated part of the label is removed from the seat portion of the jig.

27 Claims, 15 Drawing Figures

MANUAL LABEL APPLYING TEMPLATE

This application is a continuation-in-part of application Ser. No. 205,168 filed on Nov. 12, 1980, and now abandoned.

The present invention relates to a label jig which is used to guide accurate manual application of an adhesive label or an adhesive code cover at an edge of a file panel. The jig is particularly suitable for use in manually applying a label having a machine readable code which must be accurately located on the file panel for machine reading of the code.

Advances are rapidly being made in the field of file coding to enhance easy reading and control of large filing systems. In some instances, the codes are applied directly to the file and in other instances, the codes are applied as coded labels. For example, some filing systems are now characterized by colour coded labels having a specific sequence of colours to designate the code on the files. An even more recent arrangement is one in which the files in a system are provided with labels having machine readable codes which can be controlled through machine reading of the codes. Such systems may be additionally colour coded.

Both of the above described systems can be set up in a number of different manners including a drawer type system or a shelf type system where the coded edges of the files extend outwardly from the shelf. In the former system, the label need only appear on one side of the file panel. However, with the latter shelf system, it is extremely beneficial to have the files coded such that the labels are visible from either end of the system. This is a accomplished by providing a wrap-around label on the file panel edge which extends outwardly from the shelf.

Regardless of which type of label is used for coding the file, i.e., wrap around or non-wrap around, it is extremely beneficial to have the label accurately placed on the file panel for purposes of label recognition. Furthermore, similar labels should be placed consistently from one file to the next. This is particularly true in the case of the machine readable coded label where the machine readable code must be accurately placed consistently throughout the filing system to enable easy and valid machine reading of the codes on all of the labels. If the labels are applied by machine, then there is little difficulty in obtaining consistent accurate label placement. However, machine application of the labels is not always possible thereby, necessitating manual label application in same instances. Without a proper guide manual label application is generally inconsistent which substantially reduces the benefits which would otherwise be provided through the label coding of the files.

After the coded label has been applied to the file panel it is important to protect the code on the label so that the code is not worn off with use. Some labels are pre-covered with protective coating before being applied to the file, however, others are left uncovered. These uncovered labels as well as any codes applied directly to the file without using a label, therefore, require a protective cover which is added after the label or code is applied to the file. Such a protective cover, which is transparent to enable recognition of the code after the cover is added, is generally of the adhesive variety for adhering to the label or directly to the file panel and should again, be accurately placed over the code to properly protect the code whether it be on the label or on the file panel.

The present invention provides means adapted to guide accurate manual application of an adhesive member in the form of an adhesive label or an adhesive protective cover for a file code at an edge of a file panel and comprises a first guide for locating the file panel edge, a second guide for locating the adhesive member with the first and second guides being offset from one another; and a seat portion between and at generally right angles to the two guides. The seat portion is adapted to seat only a first part of the adhesive member so that when an edge of the adhesive member is fitted against the second guide, a second part of the member overhangs the seat portion above the file panel edge fitted against the first guide where the overhanging part of the adhesive member is exposed for application to the file panel, thereby locating the adhesive member in position on the panel. The seat portion which has low affinity for the adhesive member is adapted to readily release the first part without significantly detracting from its adhesiveness, for completing application of the adhesive member to the file panel.

The label guide means which is particularly useful for guiding accurate application of labels having machine readable codes which should be located at a predetermined fixed distance from the panel edge, is preferably used in a template arrangement, which further includes a panel supporting portion and guide means for positioning the file panel on the panel supporting portion such that the panel edge is located at the label guide means. According to this template arrangement, the overhanging portion of the adhesive member projects outwardly, over and above the panel supporting portion of the template. This enables an extremely easy and accurate positioning of the file panel for manual application of the label or protective cover at the file panel edge.

The above, as well as other advantages and features of the present invention will be described in greater detail according to the preferred embodiments of the present invention wherein;

Figure 1:
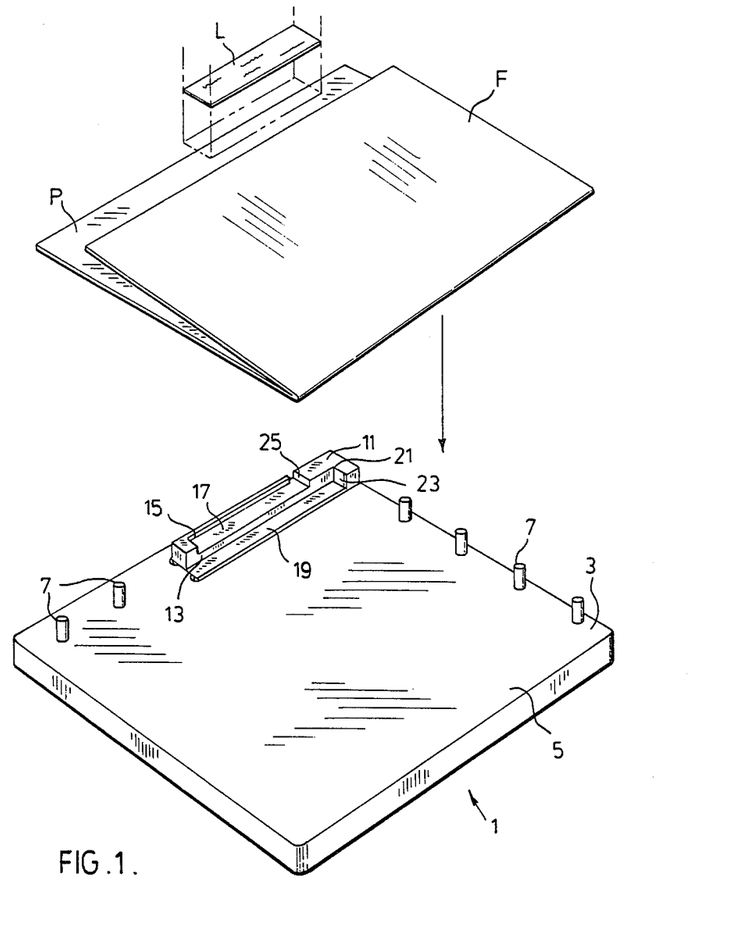
FIG. 1 is an exploded perspective view showing a file with a label being applied to one of the file panels using one form of a label applying template according to a preferred embodiment of the present invention.

As shown in FIG. 1, a template generally indicated at 1, is used to guide manual application of an adhesive label L to a panel P of a file folder F. As is more particularly shown in FIGS. 5 and 6, the label is applied such that it wraps around the edge of the panel from one side to the other of the panel. As is clearly shown in FIGS. 2 and 5, label L is coded by means of a pair of identical codes which are upside down and backwards with respect to one another at each side of the label. Each of these codes is machine readable and requires accurate location with respect to the file edge to enable valid machine reading of the code. Furthermore, the codes are positioned essentially identically on each half of the label, so that when the label is fully applied to the file panel, it is subdivided such that equal portions of the label are located on either side of the panel.

Figure 4:
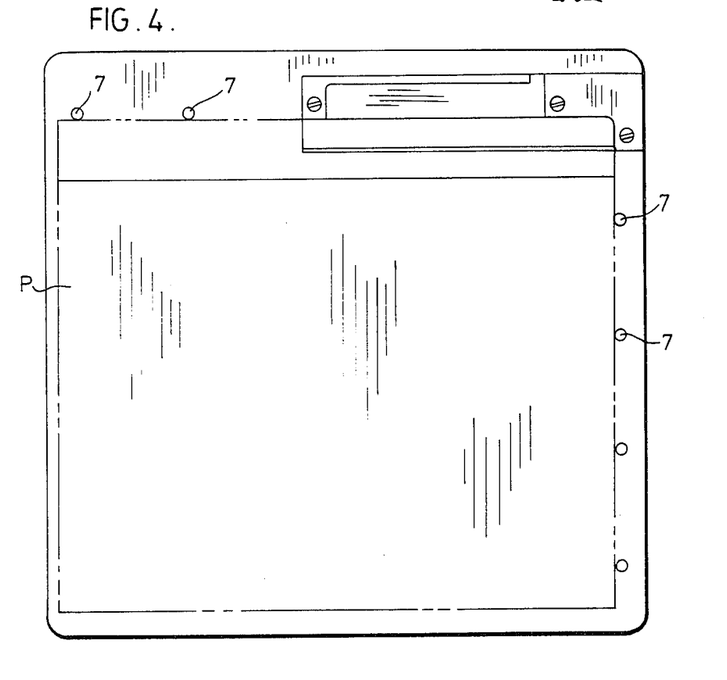
FIG. 4 is a top view of the template of FIG. 1 with the file in position on the template.

Turning to FIGS. 1 and 4, template 1 comprises a file panel supporting portion 3, pegs 7 and 7a for positioning the file panel on the panel supporting portion and label locating jig 11 along an edge of the panel supporting portion.

The panel supporting portion has a generally planar surface 5 where the file panel sits when it is in position for label application. It will be noted that the panel supporting portion of the template is open on two sides to permit easy positioning of the file panel on the supporting surface and although, FIG. 1 shows the application of the label along a side edge of the file panel, the label may also be applied along either the bottom or top edge of the panel.

Label jig 11 which has a stair-like configuration, includes a first riser 13, a second riser 15 which is raised relative to the first riser to provide a label edge guide and a generally horizontal step or tread portion 17 which separates the two vertical risers and which extends from the top of the first riser to the base of the second riser. As best seen in FIGS. 1 and 4, the first riser is in line with pegs 7 provided on the same side of the template as the label jig, so that when the file panel is properly positioned on the template flushly to the pegs, the panel edge lies against riser 13.

Located forwardly of riser 13 is a second generally horizontal step or tread portion 19 which extends from the first riser into the panel supporting portion of the template. As is clearly shown in FIG. 3, the panel supporting portion of the template is recessed at 9 to receive step portion 19, the top surface of which is coplanar with the surface 5 of panel support 3.

Label jig 11 is further provided with a right angle corner arrangement 21 having a small shoulder section 23 extending at right angles to the main body of the label jig. Shoulder 23 is aligned with the boundary line defined by pegs 7a on the same side of the template as shoulder 23 for purposes of file panel alignment during positioning of the file panel with respect to the label jig.

The label jig also includes a further shoulder portion 25 extending at right angles to and at the same level as riser 15. Shoulder portion 25 is used as a guide to properly position the end of Label L along the file panel.

Figure 2:
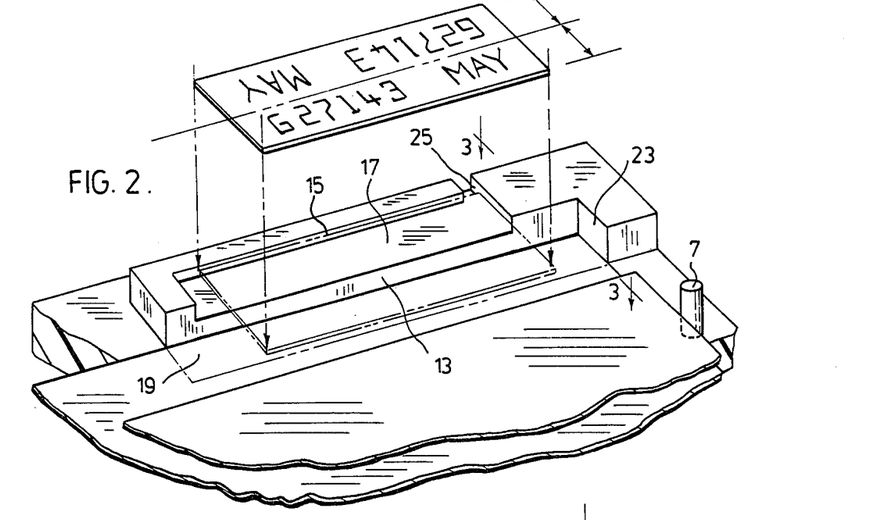
FIG. 2 is an enlarged perspective view showing in detail, the label jig of the template of FIG. 1.
Figure 3:
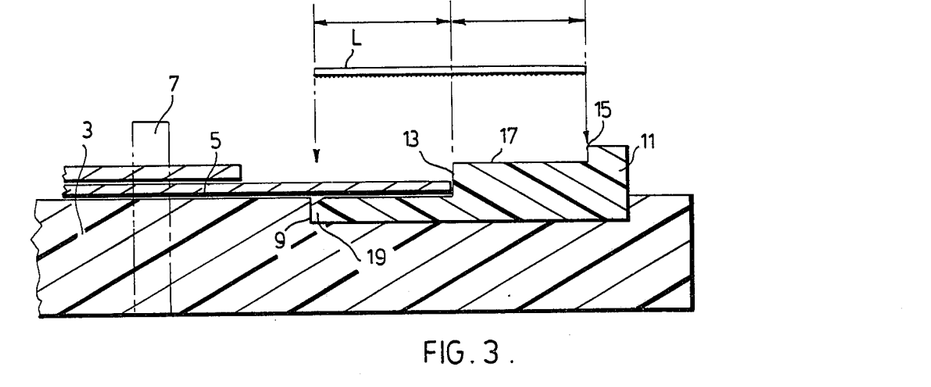
FIG. 3 is a sectional view taken along the line 3—3 of FIG. 2.

The template is used for guiding manual application of the wrap-around label as best shown in FIGS. 2 through 4. The operation is preferably accomplished by first placing the label on the jig such that its outside longitudinal edge abuts riser 15 while the end edge of the label is forced up against shoulder 25. However, it is very different to initially place the label on the jig such that it is accurately located in position. For this reason, step 17 is surfaced with a material such as Teflon, which has a low affinity for the adhesive on the label to enable easy moving of the label on the step into its proper position for application to the panel edge. When in this proper position, slightly more than half of the label is seated on step 17 while the remaining part of the label overhangs riser 13 and projects outwardly over and above, step 19, recessed in the panel supporting portion 3.

Step 19 which is also surfaced with the same material as step 17, provides a safety precaution against inadvertent, sticking of the unseated portion of the label on the panel supporting portion of the template. Therefore, if during placement of the label on the jig, the unseated portion is unadvertently bent down into contact with step 19, then this step, like step 17, will release any part of the label which comes into contact with it without significantly detracting from the adhesive properties of the label.

With the label positioned on jig 3, the file panel is then moved into position beneath the overhanging part of the label for application of the label, to one side of the file panel using the panel support 3 and guide pegs 7 and 7a to accurately position the file panel. In accordance with standard construction, one of the file panels is wider than the other panel to provide an extended edge region. The file folder is placed on the template such that this extended edge region abuts pegs 7 located along the same side of the template as the label jig. As mentiond above, riser 13 of jig 3 is aligned with these pegs so that the extended edge region of the panel fits flushly against the riser. The end of the panel is forced up against pegs 7a to complete the locating of the file panel on the panel support.

Figures 5, 6:
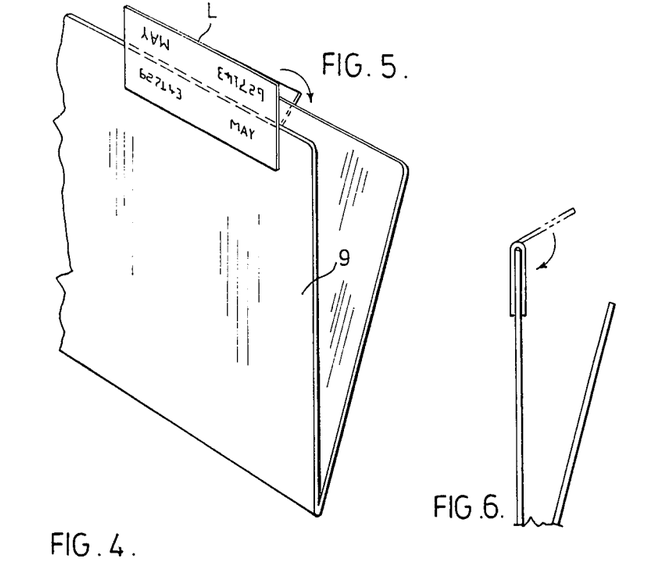
FIG. 5 is a perspective view showing partial application of the label to the file panel using the template of FIG. 4.
FIG. 6 is a sideview showing completion of the application of the label in FIG. 5.

After the label and the panel edge are accurately located in their final positions, the label is secured to the panel by simply applying a downward pressure on the unseated part of the label which adheres to the exposed side of the panel beneath the label to accurately locate the label in position on the panel. Thereafter, both the file folder and the now-located label are removed from the template with the label jig releasing the other part of the label from step 17 without significantly detracting from its adhesive properties so that the label may be wrapped around the file panel edge and applied to the opposing side of the file panel as shown in FIGS. 5 and 6. After the application of the label has been completed, each of the machine readable codes appears on opposing sides of the file panel equidistant from the edge to enable accurate machine reading of the codes from either side of the file folder. The width across step 17 is slightly greater than half of the label width so that the thickness of the file folder is taken into consideration for identical positioning of the codes on either side of the panel.

The description above has related to the combination of the label jig, panel supporting portion and guiding pegs 7. However, it is to be understood that the label jig could be used on its own and still provide an effective guide for the manual application of the label. According to this arrangement the file panel edge is again forced up against riser 13 with the corner of the file panel being located in corner region 21 such that shoulder 23 of jig 11 provides a stop to longitudinally position the jig along the file panel without the requirement of pegs 7a. Such an arrangement may again include the forward step although it may be dispensed with, particularly if the surfaced used to support the file panel has low affinity for the adhesive on the label.

Figure 7:
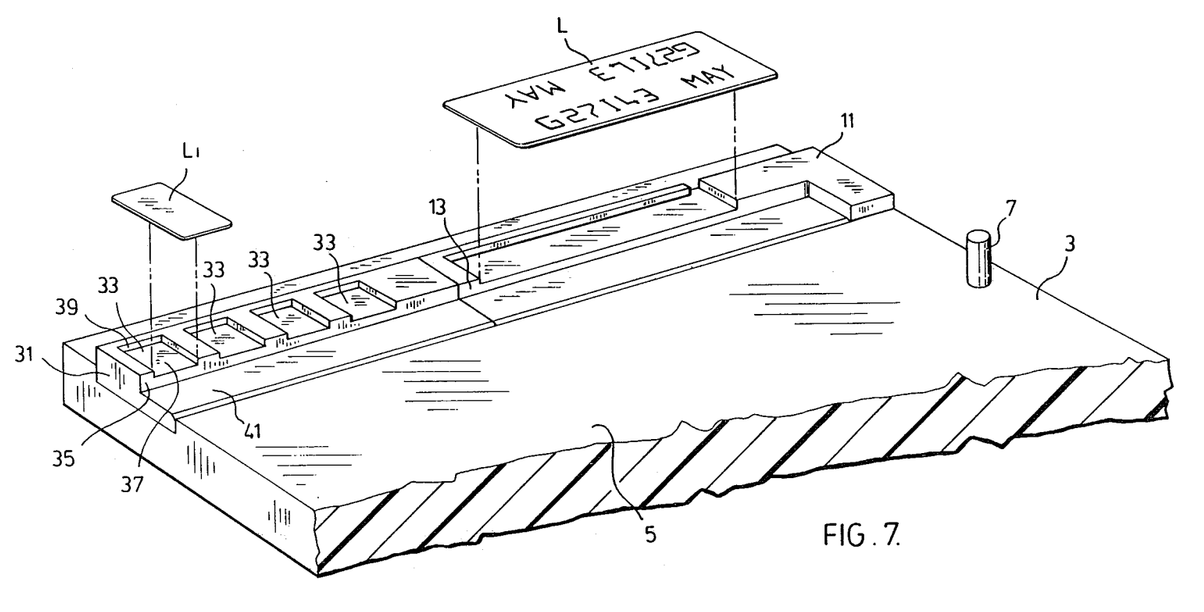
FIG. 7 is a perspective view of an alternate preferred template arrangement according to a further preferred embodiment of the present invention.

FIG. 7 shows a template comprising panel supporting portion 3, end pegs 7 and label locating jig 11 as earlier described. However, the template of FIG. 7 additionally incorporates a further label locating jig 31 used to accurately locate a colour coded label L1 for wrapping around the same file panel edge as label L. Jig 31 is provided with a plurality of inserts 33, each of which is used to locate an individual colour coded label similar to label L1. A common riser 35 extends along the entire length of jig 31. Each of the inserts has its own label seating step region 37 and rear riser 39. A forward step region 41 coplanar with surface 5 of the panel support runs along the length of jig 31 and is again, common to all of the individual inserts 33.

Jig 31 is used in essentially the same manner as jig 11 for locating the individual colour coded labels. Slightly more than half of the colour coded label is seated on step 37 which is again provided with a surface having low affinity for the adhesive on the label. The remaining part of label L1 which overhangs step 41 is exposed for application to one side of the file panel to locate the label in position on the panel. The file folder is then removed from the template with the seated part of label L1 being readily removable from step 37 to enable complete application of the label around the panel edge. It will noted in this embodiment, that no pegs 7 are required along the side of the template where jigs 31 and 11 are located since risers 35 and 13 respectively, provide a stop against which the file panel edge is fitted.

Figure 8:
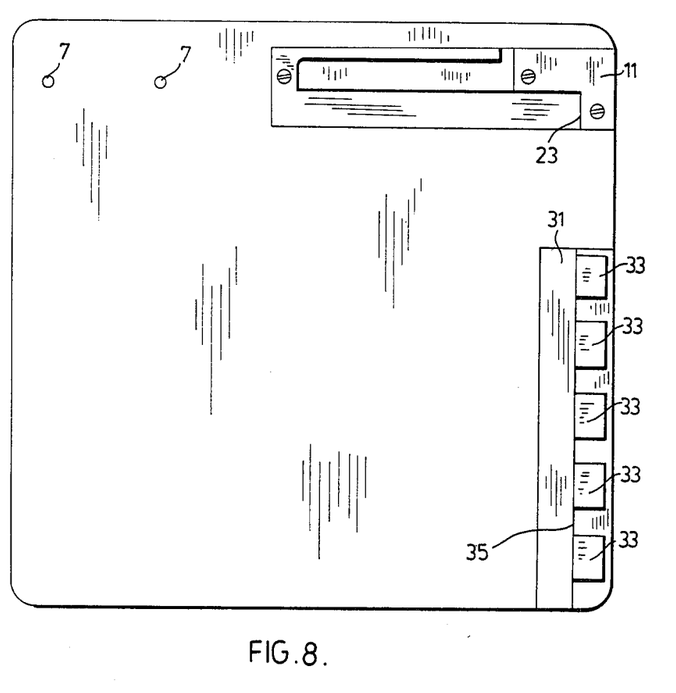
FIG. 8 is a top plan view of still another alternate arrangement of a template according to a different preferred embodiment of the present invention.

The arrangement shown in FIG. 8 is similar to the arrangement shown in FIG. 7 with the exception that jigs 11 and 31 extend at right angles to one another on separate and distinct sides of the template. This template arrangement is used for file folders in which the top edge of the file folder is provided with a wrap around machine readable coded label and the side edge of the file folder is provided with colour coded labels or vice versa. In this embodiment, jig 31 replaces pegs 7a along the side of the template at right angles to jig 1. Accordingly, riser 35 of jig 31 is aligned with shoulder 23 of jig 11.

Figure 9:
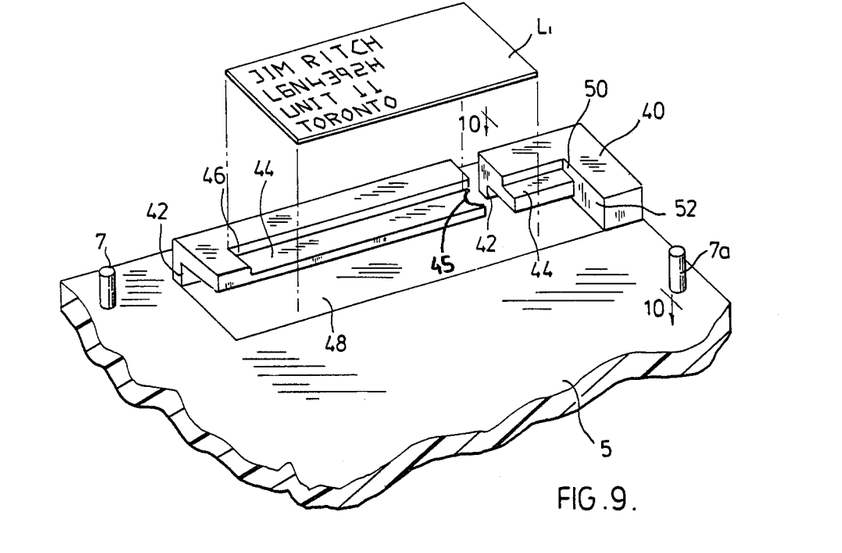
FIG. 9 is a top perspective view of an alternate form of a label applying jig according to a further embodiment of the invention.
Figure 10:
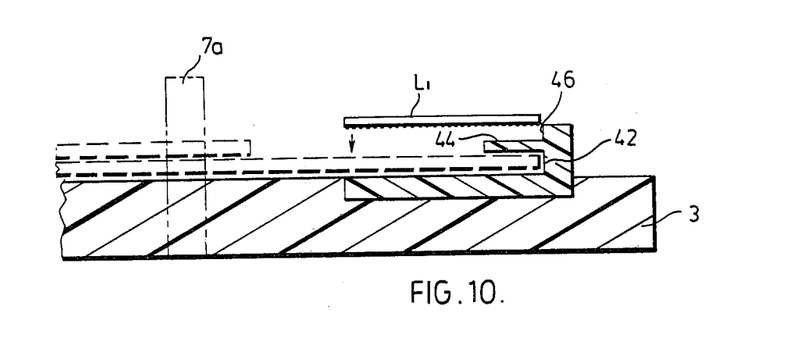
FIG. 10 is a sectional view taken along the lines 10—10 of FIG. 9.

All of the description above, has related to the application of a wrap-around label at a file panel edge. FIGS. 9 and 10 on the otherhand, show a template and jig arrangement used to accurately apply, a non-wrap-around label L1, to a file panel such that the longitudinal edge of the label aligns with the file panel edge. Label L1 is printed on one side only and is again, provided with a machine readable code which in this case is accurately located on the file panel for machine reading of the code when the edge of the label is flush with the file panel edge.

Template 3 is essentially identical to the template described above and again, consists of a panel supporting surface 5 bound on one side by pegs 7 and on a second side by pegs 7a with the other two sides of the panel support being open for placement of the file panel on the supporting surface.

Jig 40 which is used to guide the application of label L1 comprises a file panel edge guide 42, a label guide 46 and a generally horizontal plateau 44 at right angles to and between the two guides. As is best shown in FIG. 10, guides 42 and 46 are vertically aligned with one another.

Jig 40 further includes a forward plateau 48, the top surface of which is coplanar with panel supporting surface 5.

Label L1 is fitted on the label jig with its outside longitudinal edge against guide 46 and its end edge against shoulder 52. Again, it is quite difficult to initially accurately locate the label in this position so that plateau 44 which is used to seat part of the label, is surfaced with a material to which the adhesive on the back of the label has low affinity for enabling easy movement to the desired position. Plateau 48 is surfaced with a similar material to once again, prevent inadvertent sticking of the unseated part of the label to the lower plateau.

After the label has been properly positioned on the jig, the file panel is slid beneath plateau 44 such that its outside edge abuts guide 42. Pegs 7 and 7a cooperate with the jig in squaring the file panel on the template.

With both the label and the file panel in their proper respective positions, the unseated part of the label overhanging the file panel, is pushed down so that it adheres to the exposed side of the file panel. This effectively locates the label in position so that the seated portion of the label can be easily lifted from plateau 44 which due to its low affinity for the adhesive on the label, as well as the provision of a finger access 45, permits ready removing of the label to complete the label application at the edge of the file. As will be seen in FIG. 10, the vertical alignment of guides 42 and 46 ensures that the label edge is flush with the file edge if the jig is used properly.

It is to be understood that jig 40 can once again be used on its own, separately from the template or it can be used on the template in combination with a second jig such as jig 31 arranged on the same side of the template as jig 40 similar to the arrangement shown in FIG. 7 or at right angles to jig 40, similar to the arrangement shown in FIG. 8.

It is to be further understood that any or all of the jig arrangements shown above, can be used to accurately apply an adhesive coating over a code applied directly on the file panel or to a label at a file panel edge whether that label be a wrap-around or a non-wrap-around label. The method of applying the protective coating is essentially identical to the method of applying the label to the file panel. However, the cover itself, is transparent and made from a material such as Mylar, so that the code can be seen through the protective cover.

In the template arrangements above, shown in the drawings the panel edge guide of the jigs is shown as being aligned with the guiding posts on the template. However, the lower riser on the jig can be recessed to the extent that it is located outwardly of the posts or pegs on the template in which case, the panel edge would not meet with the lower riser. With this arrangement, the posts would be used on their own to guide the locating of the panel edge with respect to the jig. When the jig is used on its own, separately from the template, the first riser will be used as the file edge guide.

According to the description above, even though the label jigs can be removed from the panel supports each of the templates shown in FIGS 1, 7 and 8 is generally set up in a somewhat permanent manner for different patterns of adhesive member applications along the edge of a file panel. According to a further preferred embodiment shown in FIGS. 11 through 15 of the drawings, a template is provided which can be set up in a number of different manners and which can be changed according to the pattern of labels desired.

Figure 11:
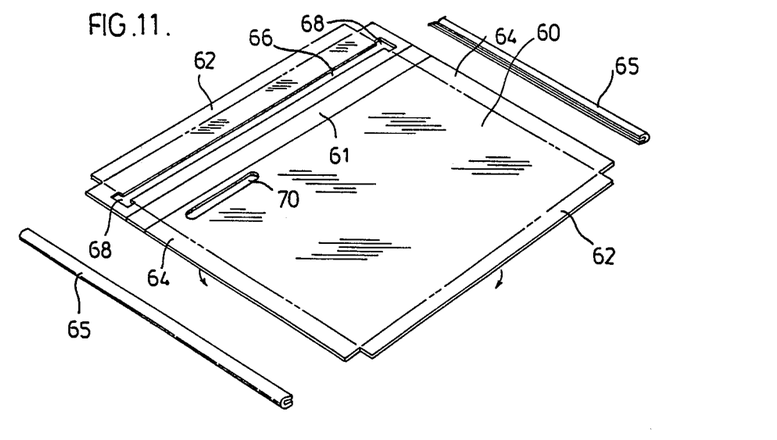
FIG. 11 shows a top perspective view of a partially formed template plate according to a further preferred embodiment of the present invention.

As shown in FIG. 11, a template base or plate 60 which is preferably formed from steel and which may be finished with a bright zinc or similar non corrosive surface includes bend down top and bottom edges 62 as well as bend down side edges 64 which are slightly wider than the top and bottom edges. An I-shaped slot 66 runs completely across the template plate such that the widened end portions of the slot are located in the opposing bend down side edges 64. The template plate is further provided with a blind ended slot 70.

Figure 12:
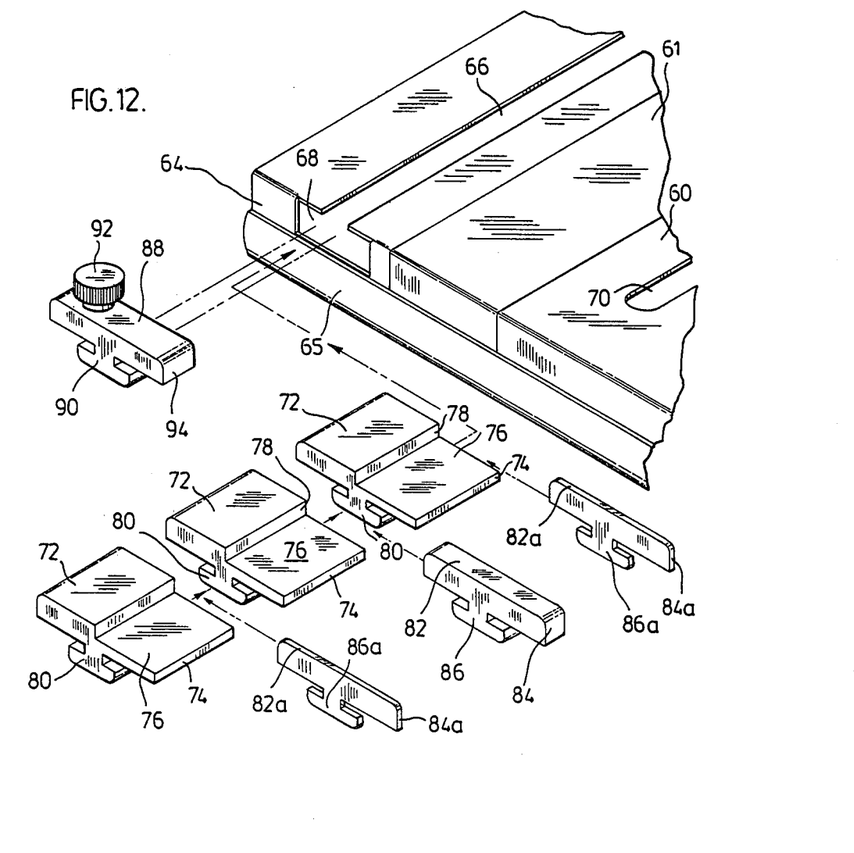
FIG. 12 is an enlarged perspective view showing one side of the template plate of FIG. 11 when fully formed and showing in perspective a plurality of segments for fitting into the template plate.

As will be seen in FIG. 12 when the side edges 64 are bent downwardly to their fully formed positions the widened portions 68 of slot 66 are located to the sides of the template while the more narrow portion of the slot extends along the top of the template to provide an undercut configuration. The side edges which project downwardly beyond the top and bottom edges are then fitted with softened bumper strips 65 on which the template rests without causing damage to any surface on which the template is supported. As will be appreciated, even after the side as well as the top and bottom edges of the template plate have been bent downwardly the template remains open from beneath to gain access to slot 70 for fitting an adjustable guide as will be described later in detail.

The downwardly bent edges of the template base need not be secured in position as the rigidity of the steel will maintain them in the FIG. 12 position.

Figures 13, 14:
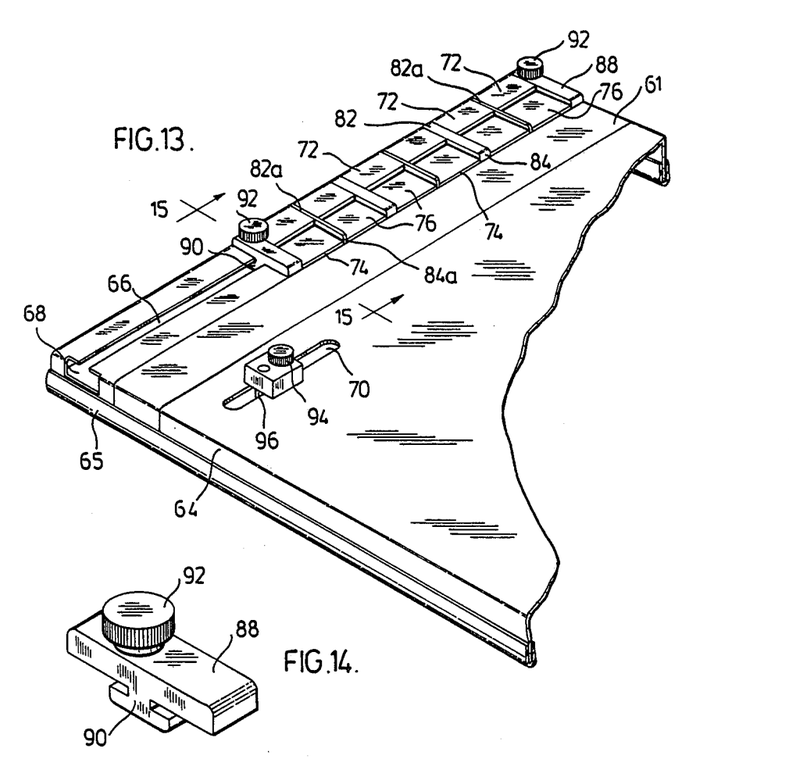
FIG. 13 is a top perspective view showing in part the fully assembled template plate of FIG. 11 with the segments of FIG. 12 in position on the template plate.
FIG. 14 is a top perspective view of a locking segment shown in FIGS. 12 and 13.
Figure 15:
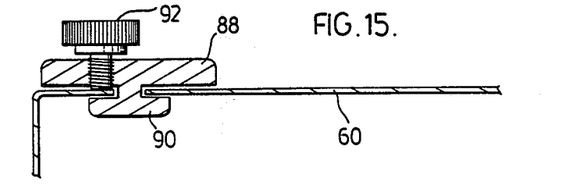
FIG. 15 is a sectional view taken along the lines 15—15 of FIG. 13.

A plurality of different segments as shown in FIGS. 12 and 13 are adapted to fit into slot 66 and to slide to essentially any desired position. These segments comprise a plurality of jig segments 72, spacer segments 82 and 82a of different width and locking segments 88. These segments may all be made from one aluminum extrusion cut at different points according to the length desired for each of the individual segments. The jig segments are then further cut out to provide a step-like construction as shown in segments 72. The locking segment is on the other hand drilled to provide a threaded bore for receiving a set screw 92.

All of the individual segments are provided with an undercut portion for fitting through the open ends 68 of slot 66. These undercut portions are shown at 80 for jig segments 72 at 86 and 86a for spacer segments 82 and 82a respectively and at 90 for locking segments 88. As is clearly shown in FIG. 15, the cooperation between the undercut portion of each of the segments and the slot 60 enables the trapped segments to be moved along the slot.

Each of the jig segments is provided with a file panel edge guide 74, a label seat portion 76 and a label edge guide 78. Each of the label seats is provided with a Teflon coating which may for instance be sprayed on the jig segments after cutting.

Spacers 82 and 82a as well as locking segment 88 both have a constant level without any step-like construction. Accordingly, when either of these segments is fitted beside one of the jig segments, they rise above the label seat portion of the jig segment where they are co-planar with the top of the label edge guide. Therefore, each of the segments 82 and 88 acts as a further label edge guide at generally right angles to the first label edge guide on each of the jig segments. This feature is clearly shown in FIG. 13.

According to this embodiment the jig segments can be moved to a plurality of different adhesive member guiding positions according to the positioning of spacer 82. For example, jig segments 72 can be positioned immediately adjacent one another without using any spacers whatsoever in the event that an elongated label is required along the file edge. Furthermore additional jig and spacer segments to those shown in the drawings may be used for a more lengthy label at the panel edge. Once the segments have been moved to the appropriate positions they are then releasably locked in those appropriate positions through locking segments 88 which are secured by tightening set screws 92 onto the template base. In the event that a different label pattern is required from that shown in FIG. 13, locking segments 88 are releasable from their secured positions to rearrange the pattern of jig segments and spacers.

It should be noted in FIG. 13 that the front edges 84, 84a and 94 of the spacer and the locking segments are flush with risers 74 of the jig segments to cooperate in guiding the file panel edge. As an additional guide the template is provided with an adjustable stop arrangement comprising a guide member 94 threadably secured to a base portion 96 on opposing sides of slot 70. This adjustable stop arrangement is used as a guide to the file panel edge which is at 90 degrees to the edge of the file located along the jig segments. In order to accommodate different widths and lengths of files the adjustable stop can be moved to any desired position along slot 70 and fixed in that position by tightening guide 94 downwardly onto base 96 and clamping the template between the guide and its base.

Consistent with the earlier embodiments of the invention the Teflon coating on the jig segments has a relatively low affinity for the types of adhesives found on labels and the like. Therefore the jig segments which are used in locating labels and label covers for manual application along the edge of a file do not noticeably detract from the adhesive properties of the label after it has been removed from the label seat portion of the jig segment. In addition, the base plate is provided with a strip 61 of Teflon adjacent slot 66 where the file panel supporting portion of the template also has a relatively low affinity for the adhesive on the labels so that if the label is inadvertently bent down into contact with the Teflon strip on the file panel support it can easily be lifted with substantially no effect to the adhesive properties of the label.

The various embodiments of the invention as described above, when properly used, will ensure that manual application of an adhesive label to a file panel edge, whether it be a colour coded label, a label provided with a machine readable code or codes, or any other type of adhesive label, is consistent from file to file in a filing system. In addition, these labels as well as codes applied directly to the file panel may be protected by an adhesive coating accurately applied to the file panel by the same jig used to apply the label to the el. Furthermore, the jig and template can be adapted for application of various sized labels at different positions on the file panel.

I claim:

1. Guide means adapted to guide accurate manual application of an adhesive member at an edge of a file panel, said guide means comprising a panel edge guide, an adhesive member guide raised relative to the panel edge guide and an adhesive member seat at generally right angles to and between the panel edge guide and adhesive member guide, said adhesive member seat being adapted to seat a first part of the adhesive member with the arrangement being such that when the panel edge is fitted along said panel edge guide, and the first part of the adhesive member is seated on the adhesive member seat with an edge of the first part of the adhesive member fitted along the adhesive member guide, a second part of the adhesive member overhangs the adhesive member seat where it is exposed for application to the file panel thereby locating the adhesive member in position on the panel, said adhesive member seat having low affinity for the adhesive member and being adapted to readily release the first part of the adhesive member to enable completion of the manual application of the adhesive member at the file panel edge.

2. A template adapted to guide accurate manual application of an adhesive label around an edge of a file panel from one side of the panel to an opposing side of the panel, said template comprising a label jig, a file panel supporting portion, and guide means for positioning the file panel on the file panel supporting portion with the file panel edge at the label jig, said label jig having a steplike construction and comprising a first riser, a second riser raised relative to said first riser and a generally horizontal tread portion which extends between said risers from the upper end of said first riser to the base of said second riser, the arrangement being such that said second riser is adapted to receive an edge of the label with the label being partially seated on said tread portion such that part of the label overhangs said first riser, where it is exposed for application to the one side of the file panel, thereby locating the label in position on the panel, said tread portion having low affinity for the adhesive label, so that it is adaped to readily release the seated part of the label to enable wrapping of the label around the panel edge and application of the released parat of the label to the opposing side of the panel.

3. A template as claimed in claim 2 wherein said label jig is provided with a further tread portion at the base of said first riser, both of said tread portions having a low affinity for the adhesive label to enable ready removal of the label from either of said tread portions, said further tread portion being substantially coplanar with the panel supporting portion of said template.

4. A template as claimed in claim 3 wherein said tread portions are surfaced with Teflon.

5. A template as claimed in claim 2, including a third riser at right angles to and level with said second riser, said third riser, being adapted to guide an end edge of said label for longitudinal positioning of the label along the file panel.

6. A template adapted to guide manual application of an adhesive label to a file panel edge such that an edge of the label aligns substantially flushly with the file panel edge, said template comprising a label jig, a panel supporting portion and guide means for positioning the file panel on the panel supporting portion such that the file edge is located along said label jig, said label jig comprising a label seat, a label guide above and at generally right angles to said label seat, and a panel receiving recess beneath said label seat said label guide being vertically aligned with the guide means on said template and said label seat being adapted to partially seat the adhesive label, the arrangement being such that when an edge of the label is fitted against the label guide, with a first part of the label seated on said label seat, a second part of the label overhangs the label seat where it is exposed for application to the file panel to locate the label in position on the panel, the label seat having low affinity to the adhesive label so that it is adapted to readily release the first part of the label to enable completion of the label application at the edge of the file panel.

7. A template as claimed in claims 2 or 6 wherein said guide means comprise upright support means projecting upwardly along two adjacent sides of said template at right angles to one another with said labal jig being located along one of said sides, said template being open at its two other sides to enable easy positioning of the file panel on the panel supporting portion of the template.

8. A template as claimed in claim 6 wherein said label guide comprises a pair of vertical risers at right angles to one another and rising upwardly from the label seat, one of said risers being adapted to guide an outside edge of the label, the other of said risers being adapted to guide an end edge of the label for longitudinal positioning of the label along the file panel.

9. A template for guiding accurate manual application of an adhesive label having a machine readable code thereon around an edge of a file panel from one side of the panel to the other such that the machine readable code is located at a predetermined distance from the edge of the panel, said template comprising a panel supporting portion adapted to receive the file panel, border means partially enclosing said panel supporting portion for positioning the file panel thereon and label locating means for locating the label relative to the panel supporting portion, said label locating means comprising a first riser at an edge of said panel supporting portion and aligned with a section of said border means for receiving the panel edge, a second riser spaced outwardly from and raised relative to said first riser, a first tread region which separates said first and second risers and which extends from the upper end of said first riser to the base of said second riser and a second tread region projecting forwardly from the base of said first riser into and coplanar with said panel supporting portion, said first tread region being adapted to seat a first part of the label so that when an edge of the label is fitted against said second riser, a second part of the label overhangs said first riser where it is exposed for application to the one side of the file panel when the panel edge is fitted against the first riser, thereby locating the label in position on the panel, the first part of the label being readily removable from the first tread region which has low affinity for the adhesive label to enable releasing of the first part of the label without significantly detracting from its adhesiveness for application of the first part of the label to the opposing side of the panel.

10. A template adapted to guide accurate manual application of an adhesive label having a pair of upside down and backwards machine readable codes one on each half of the label around an edge of a file panel such that each of the codes is located at a predetermined distance from the panel edge on opposing sides of the panel, said template comprising a panel supporting portion, guide means partially bordering the panel supporting portion for positioning the file panel on the panel supporting portion and a label jig for positioning the label relative to the panel supporting portion, said panel supporting portion having an essentially flat surface for receiving the file panel, said label jig having a step like construction and comprising a first forward tread region recessed in the panel supporting portion, a first riser at the outside of said first tread region, a second riser outwardly of and raised relative to said first riser and a second tread region which separates said risers and which extends from the upper end of said first riser to the base of said second riser, said first tread region being located at the base of said first riser, said first tread region being adapted to seat slightly more than half of the label such that when an outside edge of the label is fitted against said second riser, slightly less than half of the adhesive label is overhanging said first riser, above said first tread region where it is exposed for application to one side of the file panel when the file panel is positioned on the panel supporting portion of the template by said guide means, said second tread region having low affinity for the adhesive label to enable release of the label therefrom without significantly detracting from its adhesive properties for wrapping around the panel edge and application to the opposing side of the file panel and to enable easy positioning of the label when seated thereon, said first tread region also having low affinity for the adhesive label to limit inadvertant adherence to the first tread region during positioning of the label on said jig.

11. A template adapted to guide accurate manual application of an adhesive member at an edge of a file panel, said template comprising a file panel supporting portion for supporting the file panel and guide means for fitting into said file panel supporting portion, said file panel supporting portion having a receiving region for said guide means which comprises at least one jig segment moveable to different guiding positions in said receiving region and means for locking said at least one jig segment at the different guiding positions, said at least one jig segment having a step-like structure comprising a panel edge guide, an adhesive member guide generally parallel and raised relative to said panel edge guide and a seat portion between said panel edge guide and said adhesive member guide, said jig segment being arranged such that when the edge of the file panel is fitted along said adhesive member guide a first part of the adhesive member is seated on said seat portion and a second part of the adhesive member extends beyond the seat portion overhanging said panel edge guide of said jig segment where the second part of the adhesive member is exposed for adhering to the file panel located therebeneath, to initiate application of the adhesive member, said seat portion of said jig segment having low affinity to adhesive and being adapted to readily release the first part of the adhesive member for adhering to the file panel to complete the accurate manual application of the adhesive member at the file panel edge.

12. A template as claimed in claim 11 wherein said receiving region for said jig segment comprises an elongated slot for sliding said jig segment to said different guiding positions.

13. A template as claimed in claim 12 wherein said elongated slot is open ended and undercut for receiving said jig segment which includes an undercut portion for fitting into the open end of said elongated slot and for sliding therealong.

14. A template as claimed in claim 11 including a plurality of interchangeable jig segments adapted to receive a plurality of adhesive members at said different guiding positions.

15. A template as claimed in claim 14 including at least one spacer for fitting between said jig segments above said seat portions of said jig segments to provide a second adhesive member guide at generally right angles to the adhesive member guide of each jig segment.

16. A template as claimed in claim 15 wherein said jig segments and said spacers are formed from a common aluminum extrusion and wherein said jig segments are cut out to provide said adhesive member guide.

17. A template as claimed in claim 13 wherein said means for locking said jig segment at the different guiding positions comprises a locking segment separate from said jig segment, said locking segment having an undercut portion for fitting into and sliding along said elongated slot and being provided with an adjustable lock member for locking said locking segment.

18. A template as claimed in claim 17 wherein said locking member comprises a set screw for locking on said template.

19. A template as claimed in claims 17 or 18 wherein said elongated slot is open at both ends for receiving a pair of locking segments to either end of said slot.

20. A template as claimed in claim 11 wherein said file panel supporting portion includes an adjustable guide member for guiding the file panel at generally right angles to said panel edge guide.

21. A template as claimed in claim 20 wherein said file panel supporting portion is slotted for adjustably receiving said adjustable guide member.

22. A template as claimed in claim 21 wherein said adjustable guide member comprises a post and a base for threadably adjusting said post.

23. A template as claimed in claim 11 wherein said file panel supporting portion is formed from a base plate having bend down edges and an I-shaped slot extending across said plate spanning two of said bend down edges such that said slot is open and of increased width at said two bend down edges.

24. A template as claimed in claim 23 wherein said base plate is steel formed and finished with a corrosive free surface.

25. A template as claimed in claims 11 or 23 wherein said jig segment is Teflon coated on said seat portion.

26. A template as claimed in claim 11 including a Teflon surface on said file panel supporting surface adjacent said receiving region for said guide means.

27. A template as claimed in claim 26 wherein said Teflon surface comprises an elongated strip of Teflon adhered to said file panel supporting surface.

* * * * *